United States Patent
Wei (10) Patent No.: US 8,811,024 B2
(45) Date of Patent: Aug. 19, 2014

(54) PORTABLE ELECTRONIC DEVICE AND DETACHABLE TOUCH STRUCTURE

(75) Inventor: Ren-Jing Wei, Taipei (TW)

(73) Assignee: Wistron Corporation, New Taipei (TW)

( * ) Notice: Subject to any disclaimer, the term of this patent is extended or adjusted under 35 U.S.C. 154(b) by 340 days.

(21) Appl. No.: 13/470,990

(22) Filed: May 14, 2012

(65) Prior Publication Data

US 2013/0039022 A1    Feb. 14, 2013

(30) Foreign Application Priority Data

Aug. 9, 2011 (TW) .............................. 100214766 U (51) Int. Cl.
*H05K 5/00*      (2006.01)
*G06F 1/16*      (2006.01)
*G06F 3/0354*    (2013.01)

(52) U.S. Cl.
CPC ............ *G06F 3/03547* (2013.01); *G06F 1/169* (2013.01); *G06F 2203/04102* (2013.01)
USPC ....................... 361/752; 361/756; 361/679.18

(58) Field of Classification Search
USPC ......... 361/725, 726, 728–732, 752, 756, 796, 361/800; 439/55, 68, 70, 73, 625, 626, 629, 439/266, 267
See application file for complete search history.

(56) References Cited

U.S. PATENT DOCUMENTS

| | | | | |
|---|---|---|---|---|
| 6,163,326 A * | 12/2000 | Klein et al. | .................... | 345/156 |
| 7,948,741 B2 * | 5/2011 | Fan | ............................ | 361/679.1 |
| 8,139,347 B2 * | 3/2012 | Chiang et al. | ............ | 361/679.18 |
| 8,149,224 B1 * | 4/2012 | Kuo et al. | ..................... | 345/173 |
| 8,537,541 B2 * | 9/2013 | Zhang | ..................... | 361/679.55 |
| 8,693,179 B2 * | 4/2014 | Wei | ......................... | 361/679.18 |

* cited by examiner

*Primary Examiner* — Hung S Bui
(74) *Attorney, Agent, or Firm* — Muncy, Geissler, Olds & Lowe, P.C.

(57) ABSTRACT

A detachable touch structure is applied to a portable electronic device. The detachable touch structure includes a flexible board, a flexible touch panel, a control module, and a linkage element. The flexible touch panel is superimposedly disposed on the flexible board. The control module is connected with the flexible board, and electrically connected with the flexible touch panel; the control module includes two single path sliding slots. The linkage element includes two positioning levers; the linkage element having one end connected with the flexible board and the other end movably connected with each of the single path sliding slot via each of the positioning levers respectively connected with. The two positioning levers move along different paths with respect to the two single path sliding slots to allow the detachable touch structure to be in a tablet form or a mouse form.

20 Claims, 9 Drawing Sheets

PORTABLE ELECTRONIC DEVICE AND DETACHABLE TOUCH STRUCTURE

BACKGROUND OF THE INVENTION

1. Field of the Invention

The present invention relates to a detachable touch structure of a portable electronic device; more particularly, the present invention relates to a detachable touch structure that can be transformed into a mouse form.

2. Description of the Related Art

In general, a portable computer such as a notebook PC or a minicomputer is equipped with a touch panel to perform functions of a mouse commonly used with a desktop PC and to facilitate cursor control on a user interface. However, some people are accustomed to using mice and find it inconvenient to use touch panels; therefore, they will use externally and electrically connected mice to operate user interfaces even when their portable computers are provided with touch panels. As such, they have to carry mice along with portable computers and to sacrifice the compactness of portable computers. Besides, it is troublesome for users using wireless mice, because they have to pay attention to the power level of the wireless mice and to replace batteries/recharge the mice to keep the mice working.

Therefore, it is desirable to provide a device whose structure can be transformed to act as a touch panel or a mouse to eliminate the need for an additional mouse and to save space.

SUMMARY OF THE INVENTION

It is an object of the present invention to provide a detachable touch structure that can be transformed into a mouse form.

It is another object of the present invention to provide a portable electronic device which comprises the detachable touch structure.

To achieve the abovementioned object, the detachable touch structure of the present invention is applied to a portable electronic device. The portable electronic device comprises a containing recess for disposing the detachable touch structure of the present invention. The detachable touch structure of the present invention comprises a flexible board, a flexible touch panel, a control module, and a linkage element; the flexible touch panel is superimposedly disposed on the flexible board; the control module is connected with the flexible board, and electrically connected with the flexible touch panel; the control module comprises two single path sliding slots. The linkage element comprises two positioning levers; the linkage element having one end connected with the flexible board and the other end movably connected with each of the single path sliding slot via each of the positioning levers respectively. Wherein the two positioning levers move along different paths with respect to the two single path sliding slots to allow the detachable touch structure to be in a tablet form or a mouse form.

The portable electronic device of the present invention comprises a body, a pushing element, and the abovementioned detachable touch structure. The body comprises a containing recess for disposing the detachable touch structure. The pushing element is movably connected with the body; pushing element the touch structure can be released from the containing recess by pushing the pushing element.

DETAILED DESCRIPTION OF THE PREFERRED EMBODIMENT

These and other objects and advantages of the present invention will become apparent from the following description of the accompanying drawings, which disclose several embodiments of the present invention. It is to be understood that the drawings are to be used for purposes of illustration only, and not as a definition of the invention.

The detachable touch structure of the present invention can be applied in portable electronic devices. In an embodiment of the present invention, the portable electronic device is a notebook PC; however, the portable electronic device can be a mini computer, a tablet PC or any other electronic devices having touch panels or modules.

Figure 1:
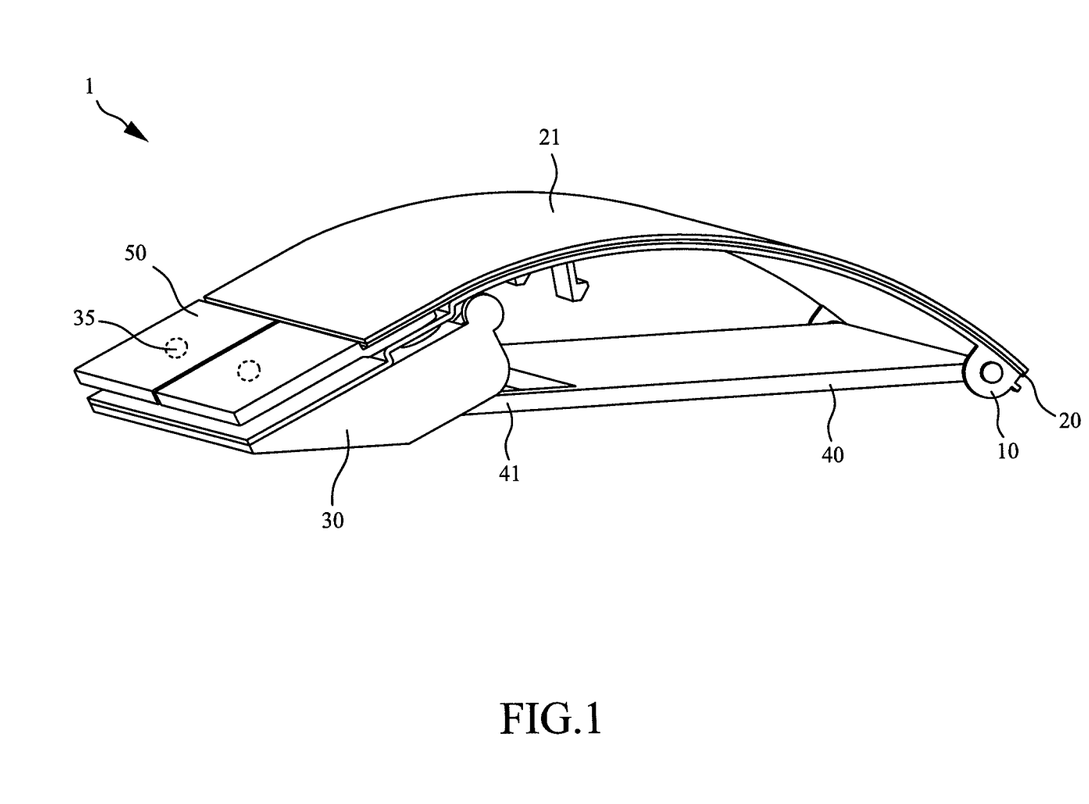
FIG. 1 illustrates a schematic drawing of the detachable touch structure of the present invention in a mouse form.
Figure 2:
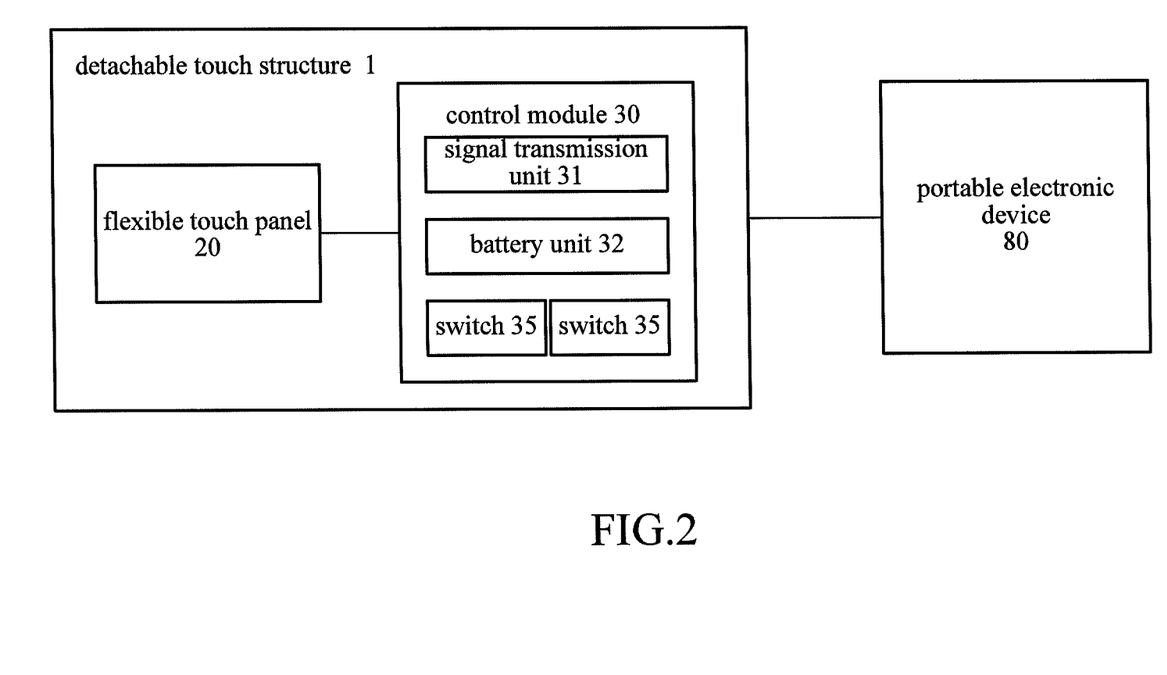
FIG. 2 illustrates a system block diagram of the detachable touch structure and the portable electronic device of the present invention.

Please refer to FIG. 1 and FIG. 2. FIG. 1 illustrates a schematic drawing of the detachable touch structure of the present invention in a mouse form. FIG. 2 illustrates a system block diagram of the detachable touch structure and the portable electronic device of the present invention.

As shown in FIG. 1, the detachable touch structure 1 of the present invention comprises a flexible board 10, a flexible touch panel 20, a control module 30, and a linkage element 40. The flexible board 10 acts as a major framework of the detachable touch structure 1; the flexible touch panel 20 is superimposedly disposed on the flexible board 10, the flexible touch panel 20 can be attached to the flexible board 10 by gluing to provide a touch function when the detachable touch structure 1 is in a tablet form. In the present embodiment, the elasticity of the materials of the flexible board 10 and the flexible touch panel 20 (such as rubber or flexible metals) allows the flexible board 10 and the flexible touch panel 20 to remain bended under normal operation condition to form the mouse form of the detachable touch structure 1 of the present invention shown in FIG. 1. Besides, the flexible touch panel 20 further comprises a thin film layer 21 attached to a surface of the flexible touch panel 20 for protecting the flexible touch panel 20 or keeping the flexible touch panel 20 from being stained. In this embodiment, the thin film layer 21 can be made of polyester or other like materials.

As shown in FIG. 1 and FIG. 2, the control module 30 is connected with the flexible board 10 by using a screw or gluing to fix it thereon. The control module 30 is electrically connected with the flexible touch panel 20 via electrical contacts for obtaining touch signals from the operation of the flexible touch panel 20.

The control module 30 comprises a signal transmission unit 31 and a battery unit 32 disposed therein. When the detachable touch structure 1 of the present invention is in a mouse form, it detaches from the body 81 of the portable electronic device 80 and uses the signal transmission unit 31 for transmitting signals between the detachable touch structure 1 and the portable electronic device 80 wirelessly; so the detachable touch structure 1 acts as a wireless mouse. In this embodiment, the signal transmission unit 31 can be a Bluetooth transmission unit or other devices capable of wireless transmission. The battery unit 32 supplies power to the detachable touch structure 1 when it is in the mouse form, and the battery unit 32 can be charged when the detachable touch structure 1 is electrically connected with the portable electronic device 80.

As shown in FIG. 1, the linkage element 40 is used for transforming and positioning the detachable touch structure 1 between the mouse form and the tablet form. The linkage element 40 comprises two positioning levers 41. The linkage element 40 has one end pivotally connected with the flexible board 10 and the other end movably connected with the control module 30 via each positioning lever 41. A displacement of the linkage element 40 can turn the flexible board 10 into a curved shape or can keep it flat, thereby switching the detachable touch structure 1 between the mouse form and the tablet form.

Figure 3:
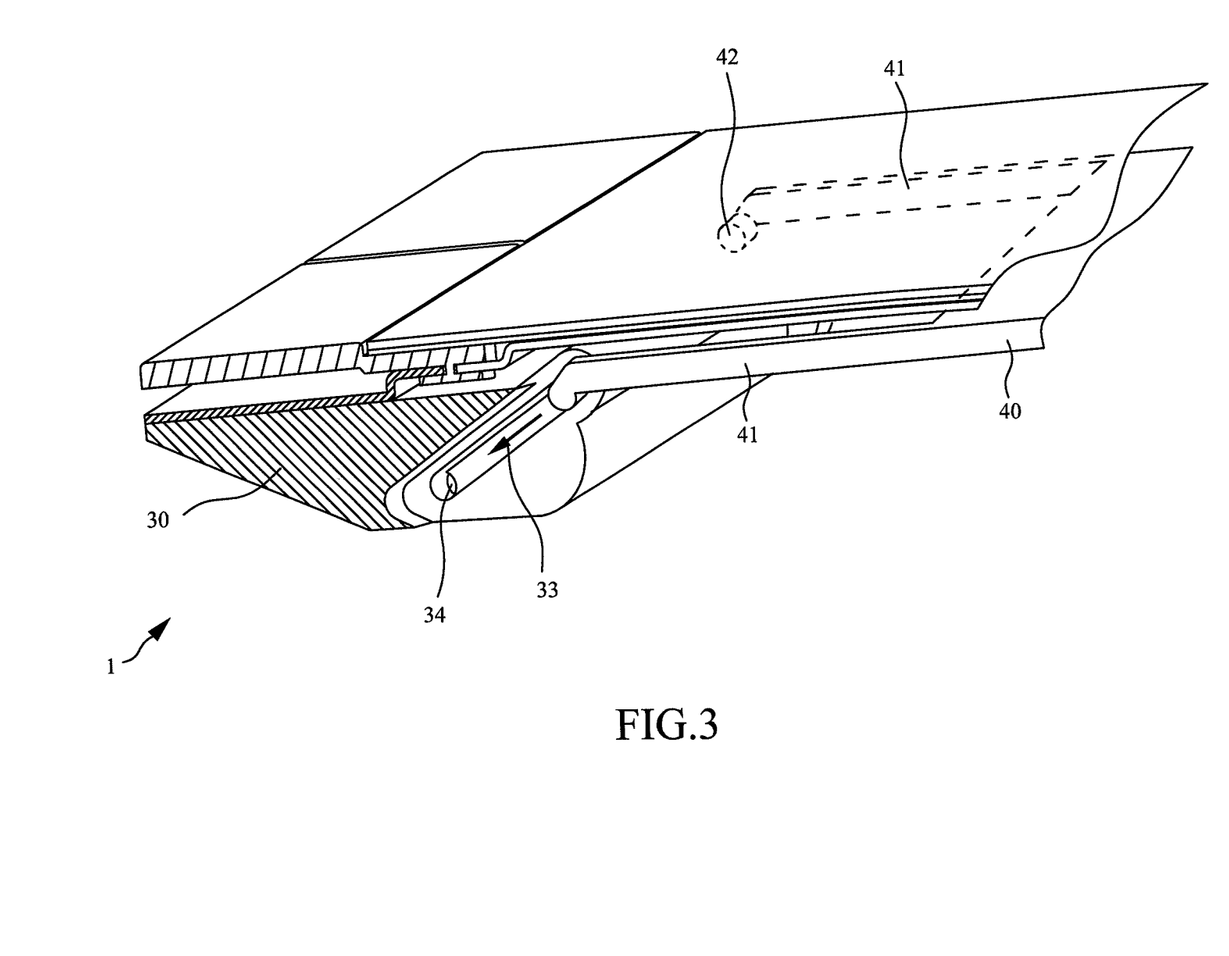
FIG. 3 illustrates a schematic drawing of the linkage element of the detachable touch structure of the present invention connected with the control module.

Please refer to FIG. 3, which illustrates a schematic drawing of the linkage element of the detachable touch structure of the present invention connected with the control module. As shown in FIG. 3, the control module 30 comprises two single path sliding slots 33 symmetrically disposed at each side of the control module 30 (only one side is shown in FIG. 3, and the single path sliding slot 33 of the other side is symmetrical to that shown in FIG. 3), the two positioning levers 41 of the linkage element 40 have column structures formed at their front ends respectively and provided for inserting into the corresponding single path sliding slots 33; therefore each of the positioning lever 41 can move along the single path sliding slots 33. Each of the single path sliding slots 33 comprises a fixing hole 34 located at one end of the single path sliding slot 33, the depth of the fixing hole 34 is deeper than the depth of the single path sliding slot 33 such that the column structure of the positioning lever 41 can be fastened with the fixing hole 34 after the positioning lever 41 moving to the fixing hole 34. At this time the detachable touch structure 1 of the present invention is in the mouse form. In the present embodiment, the single path sliding slot 33 is a straight slot, but it can be changed to other kind of slot to meet the requirement.

Furthermore, as shown in FIG. 1 and FIG. 2, the detachable touch structure 1 further comprises a plurality of keys 50, each key 50 has one end connected to the flexible board 10 and a space to keep the key 50 and the flexible board 10 separated. The control module 30 comprises a plurality of switches 35 disposed in the space and corresponded to the plurality of keys 50 respectively; therefore, when any key is pressed, a corresponding switch 35 is triggered to generate and send a control signal to the portable electronic device 1. In this embodiment, the present invention uses the plurality of keys 50 to correspond to a traditional mouse structure, but the present invention can also use any key 50 as a mouse wheel, or to extend the flexible touch panel 20 to include a touch key area for performing key functions; therefore, there can be many variations for the present invention.

Figure 4:
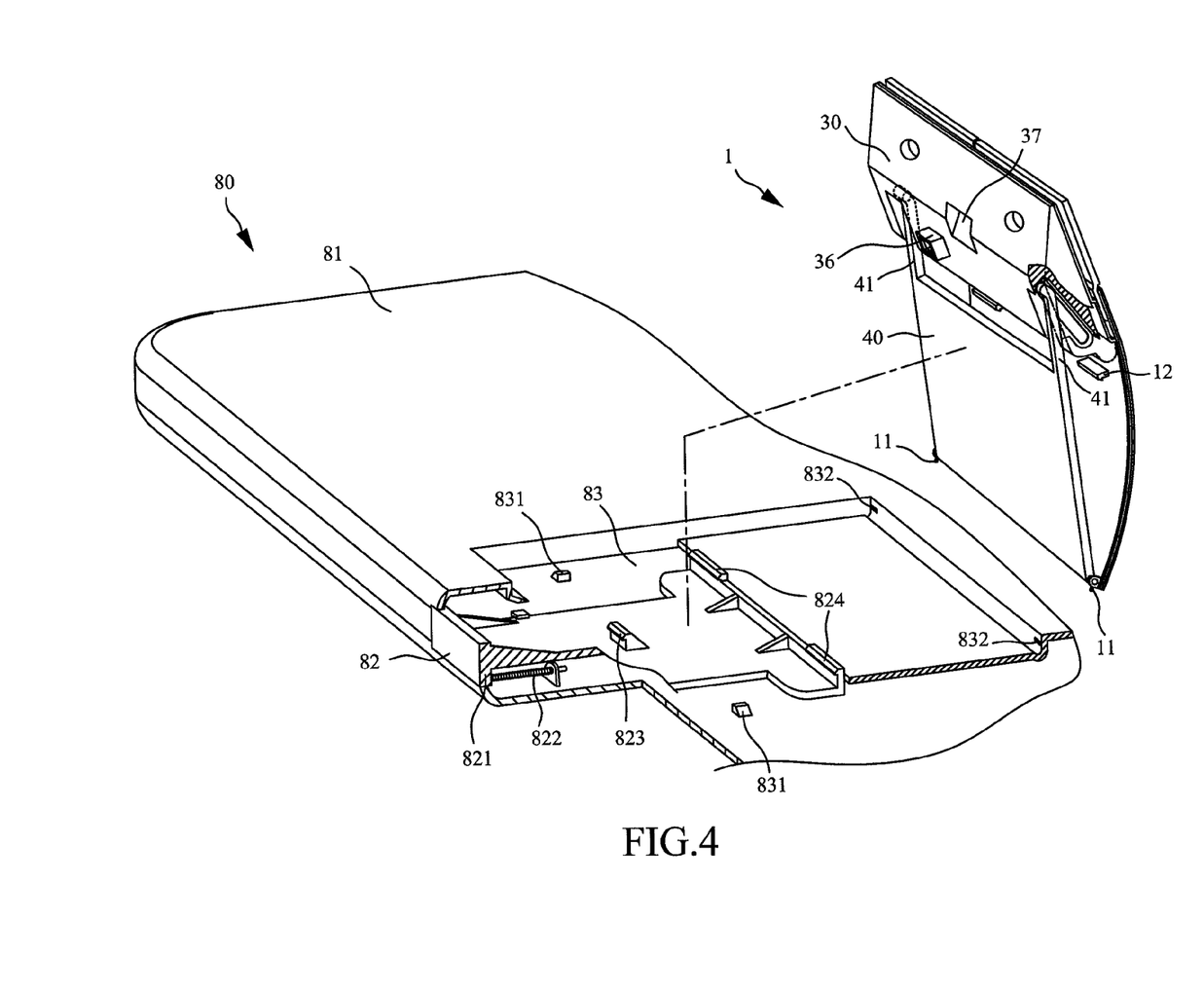
FIG. 4 illustrates a schematic drawing of the detachable touch structure of the present invention located correspondingly in the portable electronic device.

Please refer to FIG. 4, which illustrates a schematic drawing of the detachable touch structure of the present invention located correspondingly in the portable electronic device. As shown in FIG. 4, the portable electronic device 80 comprises a body 81 and a pushing element 82. The body 81 comprises a casing and various electronic components (such as a processor, a memory, and a circuit board, etc.) included therein; the body 81 comprises a containing recess 83 for disposing the detachable touch structure 1 of the present invention. The pushing element 82 moves between the initial position and the released position with respect to the body 81 when a force is applied to the pushing element 82. The pushing element 82 extends from the surface of the body 81 inwardly to the containing recess 83.

The pushing element 82 comprises a pushing portion 821, an elastic element 822, at least one first fixing portion 823, and at least one second fixing portion 824. The pushing portion 821 is provided for the user to apply a force on the pushing portion 821 so as to move the pushing element 82; the elastic element 822 allows the pushing element 82 to automatically return to the initial position with its resilient restoring force; the at least one first fixing portion 823 and the at least one second fixing portion 824 are used for fixing the detachable touch structure 1 in the containing recess 83 when the detachable touch structure 1 is in the tablet form.

The containing recess 83 comprises a plurality of guiding structure 831 and at least one third fixing portion 832. The plurality of guiding structure 831 are disposed correspondingly to the two positioning levers 41 such that each of positioning levers 41 can be detached from the corresponding fixing hole 34; the at least one third fixing portion 832 is used for helping fix the detachable touch structure 1 in the containing recess 83 when the detachable touch structure 1 is in the tablet form.

The control module 30 further comprises a connector 36, when the detachable touch structure 1 of the present invention is disposed in the containing recess 83 of the portable electronic device 80, the control module 30 is electrically connected with the body 81 of the portable electronic device 80 via the connector 36 for signal transmission. Furthermore, the control module 30 further comprises at least one front fixing portion 37 and whose position is corresponding to the at least one first fixing portion 823 of the pushing element 82.

The flexible board 10 comprises at least one rear fixing portion 11 and at least one central fixing portion 12. The at least one rear fixing portion 11 is disposed at one end neighboring to a point where the flexible board 10 and the linkage element 40 is pivotally connected, and the at least one rear fixing portion 11 corresponds to the at least one third fixing portion 832 of the containing recess 83. The at least one central fixing portion 12 is disposed between the at least one front fixing portion 37 and the at least one rear fixing portion 11, and the at least one central fixing portion 12 extends into the containing recess 83 in the tablet form. The at least one central fixing portion 12 corresponds to the at least one second fixing portion 824 of the pushing element 82.

Figure 5:
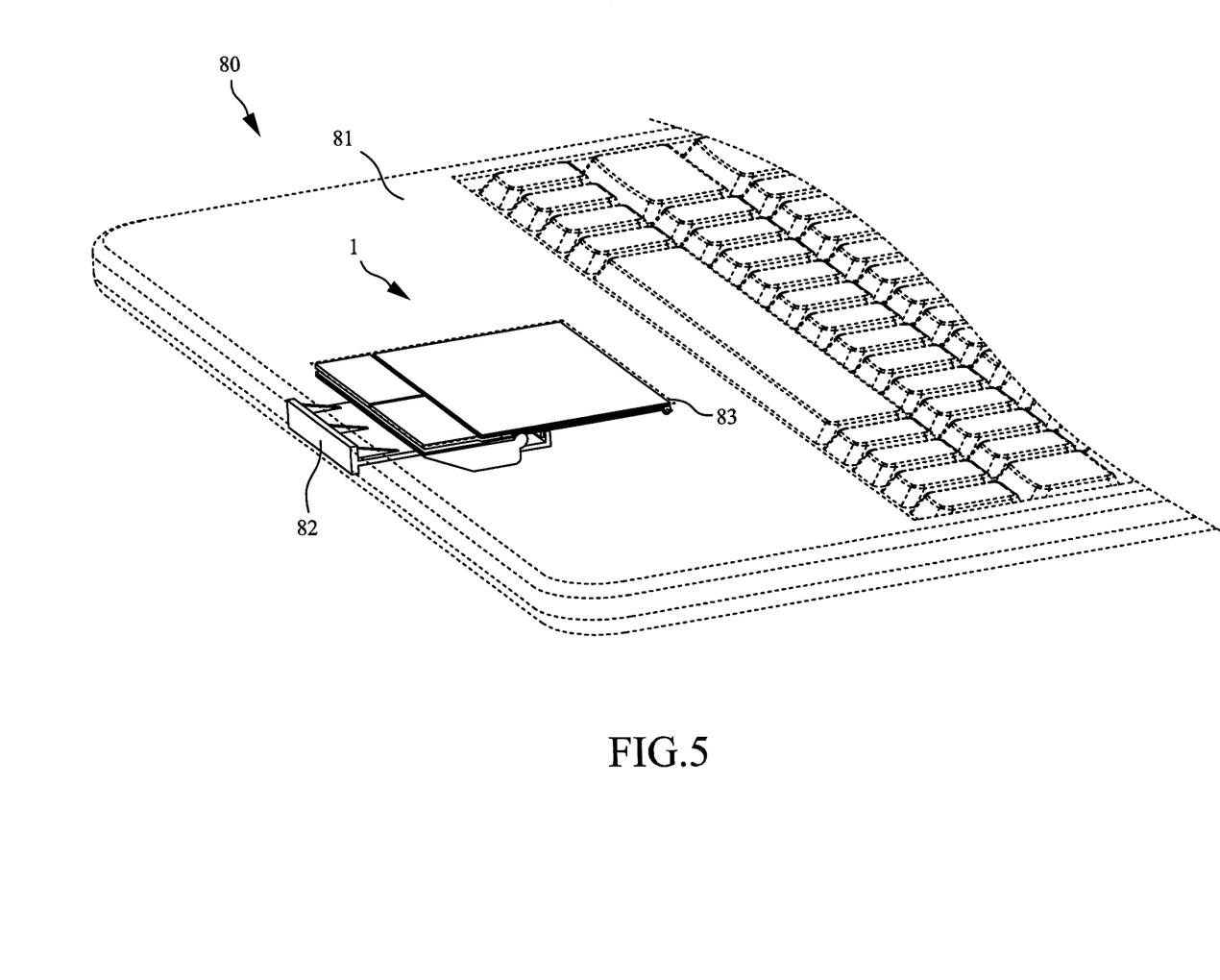
FIG. 5 illustrates a schematic drawing of the detachable touch structure of the present invention located in the containing recess in a tablet form.
Figure 6:
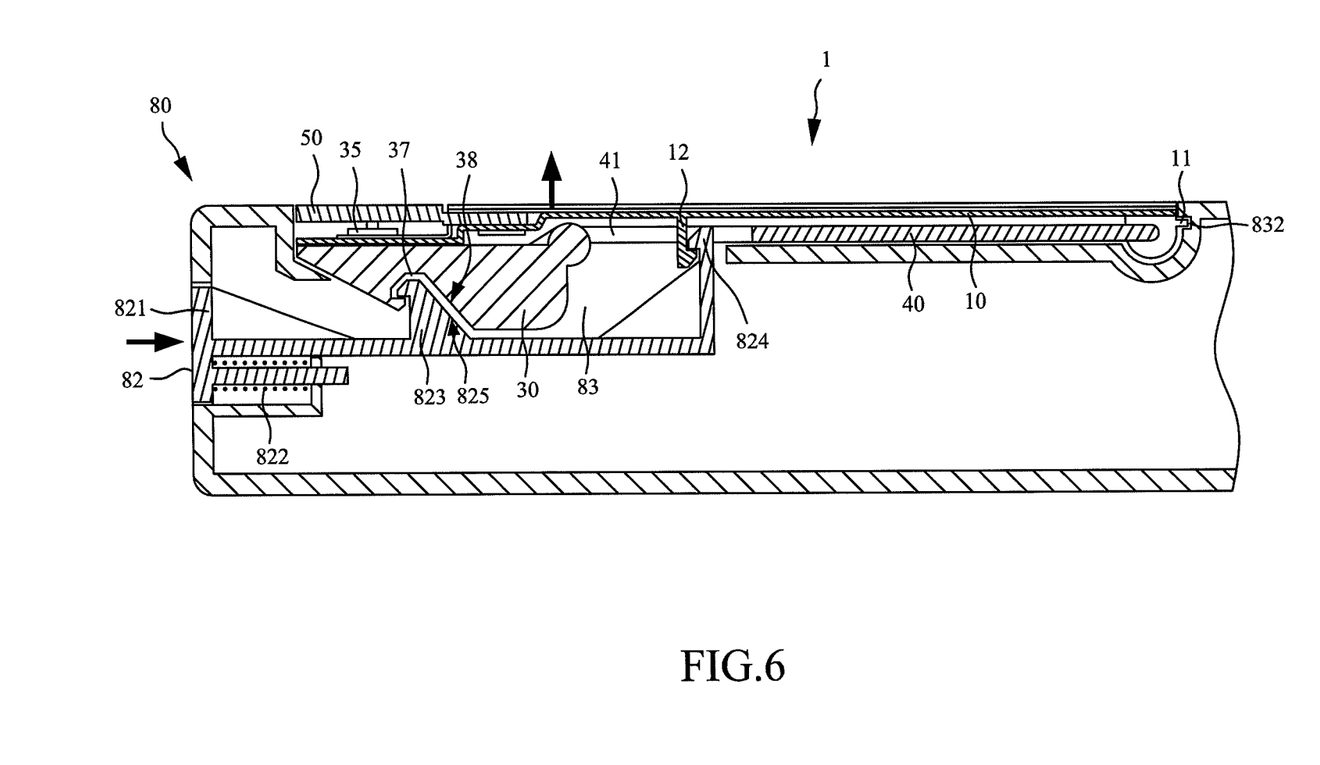
FIG. 6 illustrates a side view of the detachable touch structure of the present invention located in the containing recess in a tablet form.

Please refer to FIG. 5 and FIG. 6. FIG. 5 illustrates a schematic drawing of the detachable touch structure of the present invention located in the containing recess in a tablet form. FIG. 6 illustrates a side view of the detachable touch structure of the present invention located in the containing recess in a tablet form.

As shown in FIG. 5 and FIG. 6, after the detachable touch structure 1 of the present invention disposed in the containing recess 83 of the portable electronic device 80, the detachable touch structure 1 in the tablet form is functioned as a touch panel for the portable electronic device 80. At this time the pushing element 82 remains at the initial position, the at least one first fixing portion 823 and at least one second fixing portion 824 of the pushing element 82 are respectively fastened with the at least one front fixing portion 37 of the control module 30 and the at least one central fixing portion 12 of the flexible board 10; wherein each of the front fixing portion 37 comprises an inclined plane structure 38, and each of the first fixing portion 823 comprises an corresponding inclined plane structure 825; the at least one third fixing portion 832 of the containing recess 83 is fastened with the at least one rear fixing portion 11 of the flexible board 10. Through the fastened structure as described above, the detachable touch structure 1 is fixed stably in the containing recess 83.

In this embodiment, the at least one first fixing portion 823 and the at least one second fixing portion 824 are independent hook structures, the at least one front fixing portion 37 is a corresponding slot structure, and the at least one central fixing portion 12 is a corresponding hook structure; the at least one third fixing portion 832 is a recess structure, and the at least one rear fixing portion 11 is a corresponding column structure. However, the present invention is not limited to that design, each fastening parts can be exchangeable or replaced to other similar structures.

Figure 7:
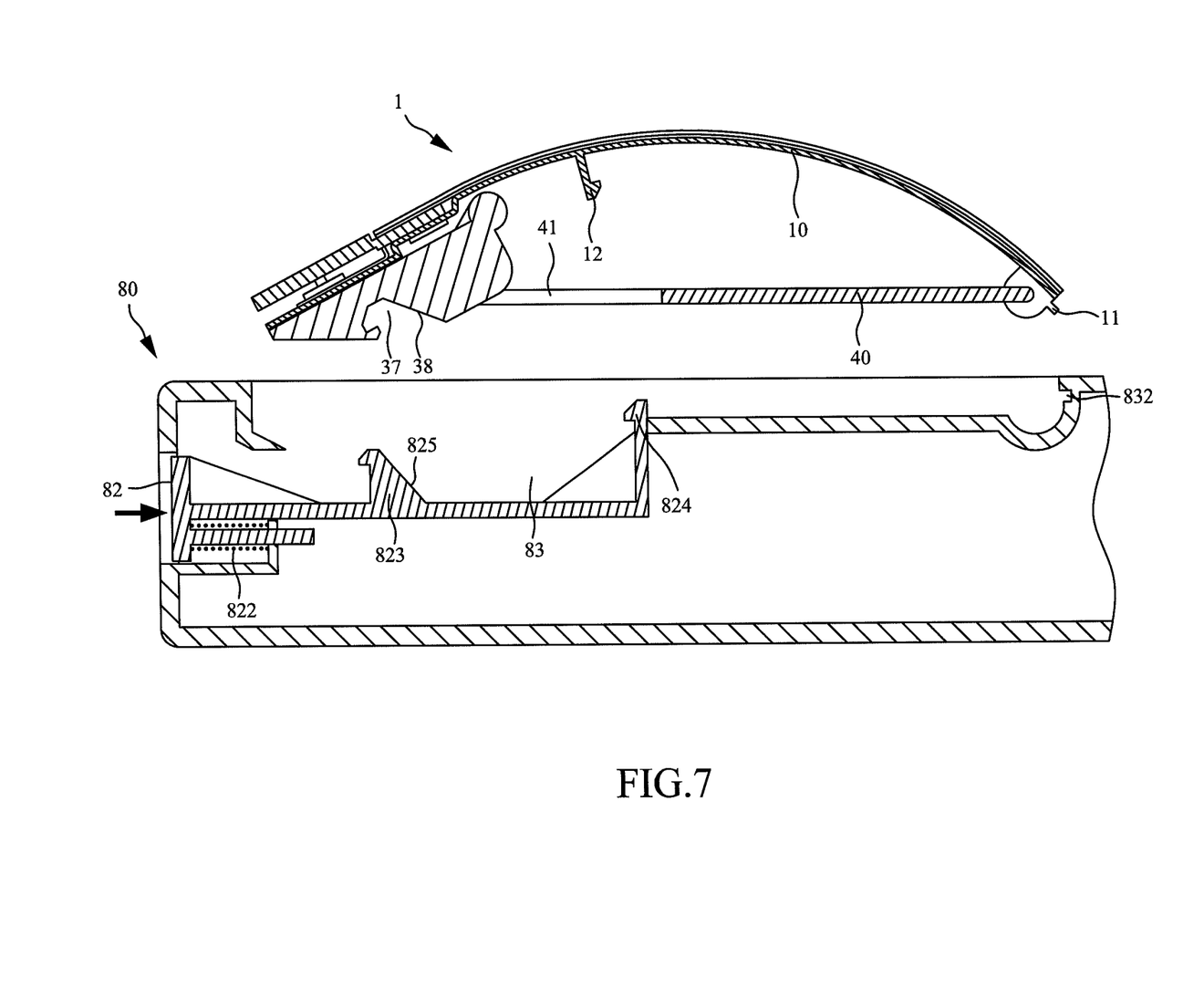
FIG. 7 illustrates a side view of the detachable touch structure of the present invention in a mouse form after detaching from the containing recess.

Please refer to FIG. 7, which illustrates a side view of the detachable touch structure of the present invention in a mouse form after detaching from the containing recess. As shown in FIG. 6 and FIG. 7, when a user pushes the pushing element 82 from the initial position, the at least one first fixing portion 823 and the at least one second fixing portion 824 will move along the pushing direction (as the arrow shown in FIG. 6). At this time, the at least one first fixing portion 823 and the at least one second fixing portion 824 are gradually detached from the front fixing portion 37, and the corresponding inclined plane structure 825 of the at least one first fixing portion 823 moves in relation to the inclined plane structure 38 of the at least one front fixing portion 37 to push the detachable touch structure 1 out of the containing recess 83.

As shown in FIG. 7, when the pushing element 82 is pushed to the released position, the first fixing portion 823 and the second fixing portion 824 is completely detached and the detachable touch structure 1 is partly pushed out of the containing recess 83. At this time the detachable touch structure 1 can be automatically returned to the mouse form and bounced to detach from the containing tank 83 by its resilient restoring force of the flexible board 10 to allow the user to operate.

Relatively, when a user wants to dispose the detachable touch structure 1 into the containing recess 83 in the mouse form, the user has to press the detachable touch structure 1, illustrated in FIG. 7, toward the containing recess 83 for transforming the detachable touch structure 1 into the tablet form the mouse form, and the detachable touch structure 1 can be fastened by the abovementioned fastening parts.

Figure 8:
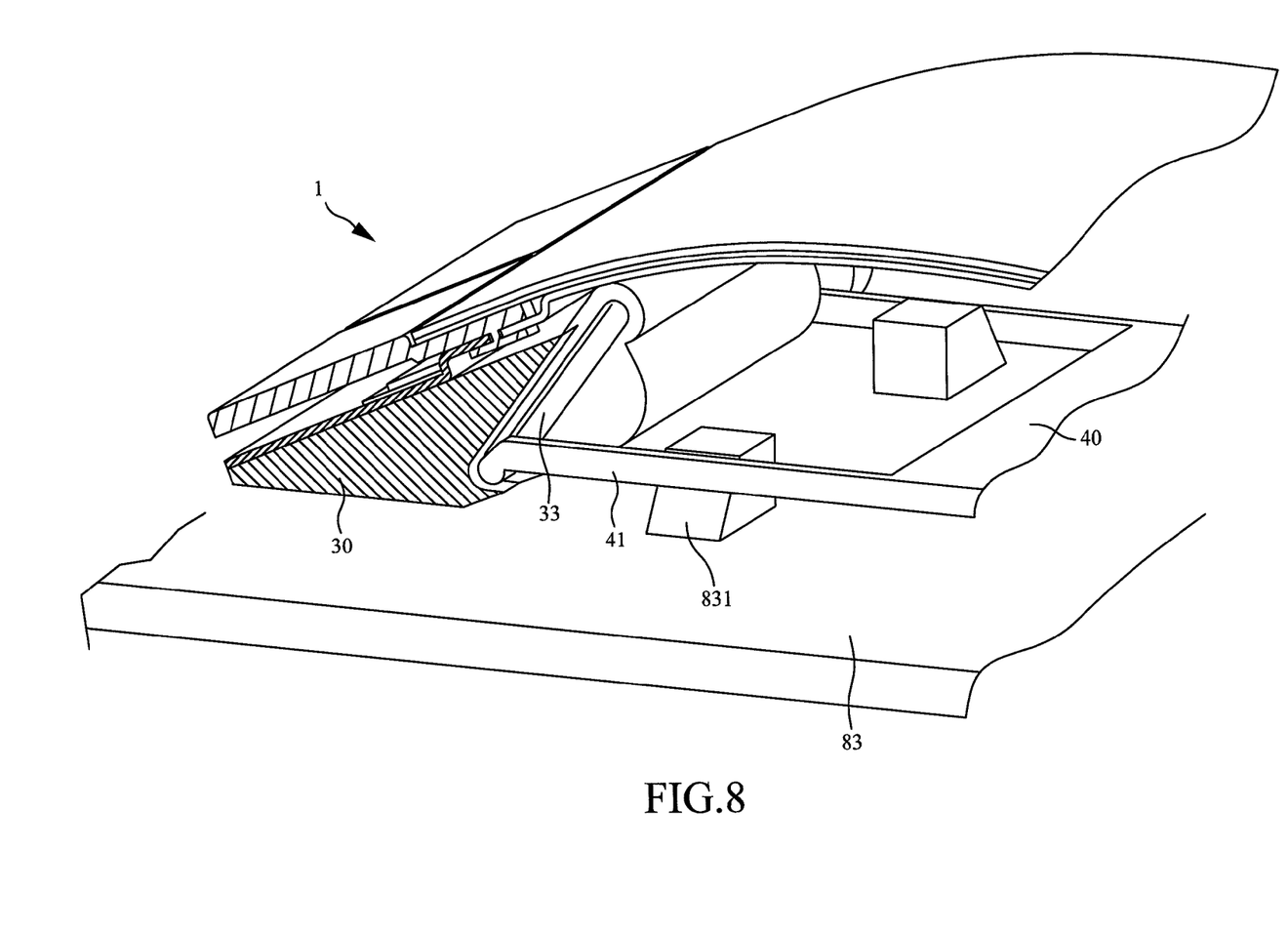
FIG. 8 illustrates a schematic drawing of the detachable touch structure of the present invention in a mouse form before being located in the containing recess.
Figure 9:
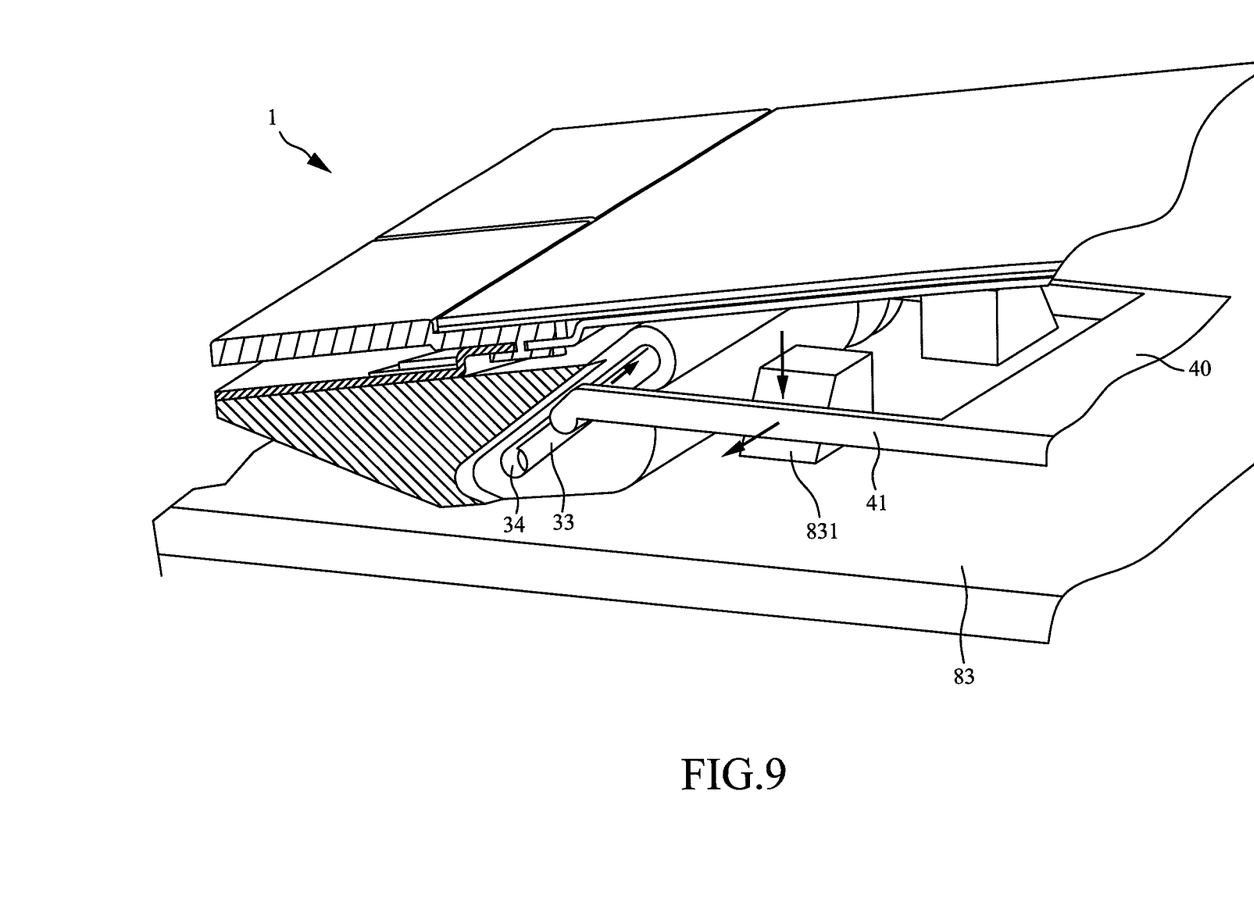
FIG. 9 illustrates a schematic drawing of the detachable touch structure of the present invention in a mouse form during the process of locating into the containing recess.

Please refer to FIG. 8 and FIG. 9. FIG. 8 illustrates a schematic drawing of the detachable touch structure of the present invention in a mouse form before being located in the containing recess. FIG. 9 illustrates a schematic drawing of the detachable touch structure of the present invention in a mouse form during the process of locating into the containing recess.

As shown in FIG. 8, when a user presses the detachable touch structure 1 toward the containing recess 83, the two positioning levers 41 of the linkage element 40 start touching the plurality of guiding structure 831, and the column structure of the two positioning levers 41 are fastened with the fixing hole (not shown in FIG) for maintaining the mouse form. As shown in FIG. 9, with the increase of the downward pressing, two positioning levers 41 are guided by the plurality of guiding structures 831 to gradually detach from the single path sliding slot 33 and move toward the outer side of the single path sliding slot 33 (the direction of movement shown as the arrows in FIG. 9). After each of the column structure of positioning lever 41 detached from the fixing hole 34, the positioning lever 41 will move towards the side of the single path sliding slot 33 which the fixing hole 34 is not disposed. Therefore, the detachable touch structure 1 can be pressed downward smoothly to form the tablet form and to be fastened via the abovementioned fastening parts.

Therefore, by using the design of the detachable touch structure 1 of the present invention, the detachable touch structure 1 to be disposed in the containing recess of the portable electronic device under normal operating condition and functioned as a touch panel; when the detachable touch structure 1 is detached from the containing recess, it can be automatically returned to the mouse form for allowing the user to operate, thereby eliminating the need for carrying an extra mouse and also saving space by combining the touch panel and mouse functions.

Furthermore, the present invention also provides a portable electronic device using the detachable touch structure. The portable electronic device comprises a body, a pushing element, and the detachable touch structure as described above; the body comprises a containing recess for disposing the detachable touch structure; the pushing element is movably connected with the body; the detachable touch structure can detached from the containing recess by pushing the pushing element. The detailed structure and operation of the portable electronic device will not be further explained since the detachable touch structure is the same as that described above.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A detachable touch structure, applied to a portable electronic device, the portable electronic device comprising a containing recess for disposing the detachable touch structure, the detachable touch structure comprising:
    a flexible board;
    a flexible touch panel superimposedly disposed on the flexible board;
    a control module connected with the flexible board, the control module being electrically connected with the flexible touch panel and comprising two single path sliding slots; and
    a linkage element comprising two positioning levers, the linkage element having one end connected with the flexible board and the other end movably connected with each of the single path sliding slot via each of the positioning levers respectively;
    wherein the two positioning levers move along different paths with respect to the two single path sliding slots to allow the detachable touch structure to be in a tablet form or a mouse form.

2. The detachable touch structure as claimed in claim 1, wherein each of the single path sliding slots comprises a fixing hole, the fixing hole is located at one end of the single path sliding slot; when the positioning lever is moved to and fastened with the fixing hole, the detachable touch structure is in the mouse form.

3. The detachable touch structure as claimed in claim 2, further comprising a plurality of keys connected with the flexible board; the control module comprising a plurality of switches disposed corresponded to the plurality of keys; when any key is pressed, a corresponding switch is triggered to generate a control signal.

4. The detachable touch structure as claimed in claim 1, wherein the control module further comprises at least one front fixing portion, each of the front fixing portions comprising an inclined plane structure.

5. The detachable touch structure as claimed in claim 4, wherein the flexible board comprises at least one rear fixing portion disposed at one end neighboring to a point pivotally connected with the linkage element.

6. The detachable touch structure as claimed in claim 5, wherein the flexible board comprises at least one central fixing portion, the at least one central fixing portion is disposed between the at least one front fixing portion and the at least one rear fixing portion; when in the tablet form, the at least one central fixing portion extends into the containing recess.

7. The detachable touch structure as claimed in claim 1, wherein the control module further comprises a signal transmission unit for transmitting the control signal to the portable electronic device wirelessly.

8. The detachable touch structure as claimed in claim 1, wherein the control module further comprises a battery unit.

9. The detachable touch structure as claimed in claim 1, wherein the control module further comprises a connector electrically connected with the portable electronic device when the detachable touch structure is disposed in the containing recess.

10. A portable electronic device, comprising:
a body comprising a containing recess;
a pushing element connected movably to the body, the pushing element comprises at least one first fixing portion and at least one second fixing portion; and
a touch structure which is replaceable located in the containing recess, the touch structure comprising:
a flexible board;
a flexible touch panel superimposedly disposed on the flexible board;
a control module connected with the flexible board, the control module is electrically connected with the flexible touch panel and comprising two single path sliding slots; and
a linkage element comprising two positioning levers, the linkage element having one end connected with the flexible board and the other end is movably connected with each the single path sliding slot via each of the positioning levers which is corresponded to each of the single path sliding slot respectively;
wherein the two positioning levers move along different paths with respect to the two single path sliding slots to allow the detachable touch structure to be in a tablet form or a mouse form;
when the pushing element is at an initial position, the touch structure in the tablet form is fastened in the containing recess by the at least one first fixing portion and the at least one second fixing portion; when the pushing element is being pushed to move from the initial position to a released position, the at least one first fixing portion and the at least one second fixing portion detach from the touch structure so as to form the mouse form and to release the touch structure from the containing recess.

11. The portable electronic device as claimed in claim 10, wherein each of the single path sliding slots comprises a fixing hole, the fixing hole is at one side of the single path sliding slot; when the positioning lever is moved to and fastened with the fixing hole, the detachable touch structure is in the mouse form.

12. The portable electronic device as claimed in claim 11, wherein the containing recess further comprises a plurality of guiding structures disposed correspondingly to the two positioning levers; while a force is applying on the touch structure in the mouse form to place the touch structure into the containing recess, each of the positioning levers is detached from the corresponding fixing hole by the plurality of guiding structures.

13. The portable electronic device as claimed in claim 10, wherein the touch structure further comprising a plurality of keys and the control module comprises a plurality of switches disposed corresponded to the plurality of keys; when any key is pressed, a corresponding switch is triggered to generate a control signal.

14. The portable electronic device as claimed in claim 10, wherein the control module further comprises at least one front fixing portion disposed correspondingly to the at least one first fixing portion; each of the front fixing portion comprising an inclined plane structure, and each of the first fixing portion comprising a corresponding inclined plane structure.

15. The portable electronic device as claimed in claim 14, wherein the flexible board comprises at least one rear fixing portion disposed at one end neighboring to a point pivotally connected with the linkage element.

16. The portable electronic device as claimed in claim 15, wherein the flexible board comprises at least one central fixing portion disposed correspondingly to the at least one second fixing portion, the at least one central fixing portion disposed between the at least one front fixing portion and the at least one rear fixing portion; when in the tablet form, the at least one central fixing portion extends into the containing recess.

17. The portable electronic device as claimed in claim 10, wherein the control module further comprises a signal transmission unit for transmitting the control signal to the portable electronic device wirelessly.

18. The portable electronic device as claimed in claim 10, wherein the control module further comprises a battery unit for supplying power in the mouse form.

19. The portable electronic device as claimed in claim 10, wherein the control module further comprises a connector electrically connected with the portable electronic device when the detachable touch structure is disposed in the containing recess.

20. The portable electronic device as claimed in claim 10, wherein the pushing element further comprises an elastic element, the elastic element brings the fastening element back to the initial position by a resilient restoring force pushing element.

* * * * *